United States Patent Office 3,507,963
Patented Apr. 21, 1970

3,507,963
COMPOSITIONS AND METHODS FOR CONTROLLING FUNGI WITH N-BENZYLIDENE ALKYLAMINES
Raphael Menasse and Karl Gatzi, Basel, Switzerland, assignors to Geigy Chemical Corporation, Ardsley, N.Y., a corporation of New York
No Drawing. Continuation-in-part of application Ser. No. 512,811, Dec. 9, 1965. This application Feb. 28, 1968, Ser. No. 708,808
Claims priority, application Switzerland, Dec. 14, 1964, 16,125/64
Int. Cl. A01n 9/20, 21/00
U.S. Cl. 424—304     7 Claims

ABSTRACT OF THE DISCLOSURE

N-benzylidene alkylamines in which the alkyl group has from 8 to 18 carbon atoms, and in which the phenyl moiety is optionally substituted, are fungicidal agents. Compositions containing these compounds are fungicides and methods for combatting fungi use these compounds.

Cross reference to related applications

This application is a continuation-in-part of our pending patent application Ser. No. 512,811, filed Dec. 9, 1965, now abandoned.

Detailed disclosure

The present invention concerns new fungicidal agents containing N-benzylidene alkylamines as active substances, methods for combatting fungi, especially phytopathogenic fungi on the one hand and for protecting organic materials from attack by noxious fungi, on the other hand, by the use of such active substances and agents, as well as processes for the production of the fungicidal agents.

It has been found that fungicidal agents which contain, as active substances, N-benzylidene alkylamine compounds of the formula

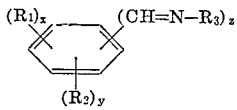

(I)

wherein $R_1$ represents hydrogen, a halogen atom, a hydroxyl group or an alkyl radical having from 1 to 4 carbon atoms,
$R_2$ represents hydrogen, a halogen atom, a nitro, carboxyl, or cyano group, an alkyl, alkylamino, dialkylamino, alkoxy, dialkylaminoalkoxy, alkylthio or alkoxycarbonyl radical having preferably from 1 to 4 carbon atoms in the alkyl moieties, of the last seven substituents mentioned,
$R_3$ represents an alkyl or alkenyl radical having from 8 to 18 carbon atoms,
$x$ represents a whole number from 1 to 3,
$y$ represents a whole number from 1 to 2,
$z$ represents the number 1 or 2, and the sum of $x$, $y$ and $z$ is not greater than 6, are excellently suitable for combatting phytopathogenic fungi and for the protection of living plants and parts of plants from attack by such fungi. N-benzylidene alkylamines of Formula I in which $R_1$ and $R_2$ are hydrogen and $R_3$ is an alkyl radical with 8, 12 or 18 carbon atoms or $R_1$ is the nitro group, $R_2$ is hydrogen and $R_3$ is the octyl radical, are known substances; however, it was not known until now that they exert a specific fungicidal activity on phytopathogenic fungi without being at the same time unduly phytotoxic.

The invention therefore provides, in a first aspect, a novel method for combatting phytopathogenic fungi and for protecting living plants and parts thereof from attack by such fungi, which method comprises applying to such plants or plant parts to be protected against such attack or to an area in which plant growth is to be protected and such fungi are to be combatted, a fungicidally effective amount of a compound of Formula I.

For this purpose, and taking into account the type of crop to be protected, e.g. planted fields or groves of fruit trees, etc., as well as differences in regional climatic conditions, application of from about 1000 to 2000 liters of a liquid, sprayable composition having a content of 0.1% of an active compound according to the invention, per hectare, or proportionally lesser amounts in case compositions such as powders having higher concentrations of active substances are used in field crops, and about 10 to 50 liters of the liquid, sprayable compositions having the said content of active substance or correspondingly lesser amounts of the preferably used powders, if these are of higher concentrations, may be required for a full-grown fruit tree of average size.

In another aspect the invention provides novel fungicidal compositions which comprise a fungicidally effective amount of one or several compounds of Formula I as well as suitable carriers therefor which are described in detail further below.

The active substances of the general Formula I contained in the new agents are effective against numerous phytopathogenic fungi. For this reason these agents are used for the protection of living plants and living parts thereof such as blossoms, seeds, fruit, roots, stems and foliage from attack by fungi and for combatting fungi on these parts of the plants. The active substances are also systemic fungicides and it is due to this property that the treated plants are given a longer lasting and more extensive protection from attack by fungi. There are no phytotoxic effects when the new agents are so used in plant protection that the concentration of active substance ranges between 0.01 and 2% by weight calculated on the weight of agent.

As seed dressing, the new fungicidal agents afford good protection to the treated seeds, in particular from attack by *Tilletia tritici* and *Fusarium culmorum*. There is no inhibition of germination. In the protection of crops, particularly satisfactory results are obtained in the control of powdery mildew.

The fungicidal agents are produced by methods known per se by intimately mixing and milling the active substances of general Formula I with suitable carriers, optionally with the addition of dispersing agents or solvents which are inert to the active substances. The fungicidal N-benzylidene alkylamines of the general Formula I can be used in plant protection in the following forms:

Solid forms: Dusts, sprinkling agents, granulates (coated granulates, impregnated granulates, homogeneous granulates);
Water dispersible concentrates of active substance: Wettable powders, pastes, emulsions;
Liquid forms: Solutions.

To produce the solid forms for use (dusts and sprinkling agents, granulates), the active substances are mixed with solid carriers. Examples of such carriers are kaolin, steatite, bole, loess, chalk, limestone, dolomite, stone powder, ground silica waste, feldspar, mica, calcium and magnesium sulfates, milled synthetic plastics, fertilisers such as ammonium sulfate, ammonium phosphates, ammonium nitrate, urea, ground vegetable products such as bran, bark dust, sawdust, ground nutshells, or lignin. These carriers can be used alone or admixed with each other.

The particle size of the carriers is, for dusts up to about 100μ, for sprinkling agents from about 75μ to 0.2 mm. and for granulates about 0.2 mm.

As a general rule, the concentrations of active substances in the solid preparations are from 0.5 to 80% by weight.

To these mixtures can also be added additives which stabilise the active substance and/or commercially available non-ionic, anionic and cationic surfactants which, for example, improve the adhesion of the active substances on plants and parts of plants (glues, adhesives) and/or attain better wettability (wetting agents) and dispersibility (dispersing agents) of the active substances.

The concentrates of active substances which can be dispersed in water, i.e. wettable powders, pastes and emulsion concentrates, are agents which can be diluted with water to any concentration desired. They consist of active substance, carrier, optionally additives which stabilise the active substance, surface active substance and anti-foam agents and, optionally, solvents. The concentration of active substance in these agents is 5 to 80% weight per volume.

Wettable powders and pastes are obtained by mixing and milling the active substances with dispersing agents and pulverulent carriers in suitable mixers and milling machines until homogeneity is attained. Carriers are, for example those mentioned in the paragraph dealing with solid forms for application. In some cases it is advantageous to use mixtures of different carriers. As dispersing agents commercially available surface active compounds can be used.

Examples of anti-foam agents are, e.g. silicones "Antifoam A" etc.

The active substances are so mixed, milled, sieved and strained with the additives mentioned above that the solid particle size in wettable powders and in pastes is not more than 20 to 40μ and 3μ respectively. To produce emulsion concentrates and pastes, dispersing agents, organic solvents and water are used. Examples of solvents are as follows: alcohols, benzene, xylenes, toluene, dimethyl sulphoxide, dimethyl formamide and mineral oil fractions boiling within the range of 120 to 350°.

The solvents must be almost without smell, not phytotoxic, inert to the active substances and not easily inflammable.

In addition, the agents according to the invention can be used in the form of solutions. For this purpose, the active substance or several active substances of general Formula I is/are dissolved in suitable organic solvents, mixtures of solvents or in water. Aliphatic and aromatic hydrocarbons, their chlorinated derivatives, alkyl naphthalenes either alone or admixed with each other can be used as organic solvents. The solutions should contain the active substances in a concentration range from 1 to 20% weight per volume.

The agents according to the invention can be admixed with other biocidal active substances or agents. Thus, to broaden the range of action, the new agents can contain, in addition to the compounds of general Formula I mentioned, e.g. insecticides, other fungicides, bactericides, fungistatica, bacteriostatica or nematicides. The agents according to the invention can also contain fertilizers, trace elements etc.

According to a third aspect, the invention provides novel N-benzylidene alkylamines of the formula

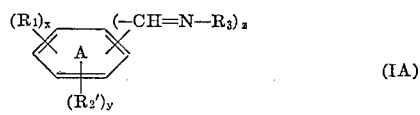

(IA)

wherein each $R_1$ is selected, independently, from any other $R_1$, from hydrogen, a halogen atom, a hydroxyl group or an alkyl group of from 1 to 4 carbon atoms, each $R_2'$ is selected, independently, from a halogen atom, a nitro or cyano group or an alkylamino, dialkylamino, alkoxy, dialkylamino-alkoxy, alkylthio or alkoxycarbonyl radical the alkyl moiety of each of the foregoing six radicals having from 1 to 4 carbon atoms, $R_3$ represents an alkyl or alkenyl radical having from 8 to 18 carbon atoms, $x$ represents a whole number from 1 to 3, $y$ represents a whole number from 1 to 2, $z$ represents the number 1 or 2, and the sum of $x$, $y$ and $z$ is not greater than 6;

and as a preferred group among the compounds of Formula IA: those which contain not more than 2 halogen atoms and no nitro and carboxyl groups as substituents in ring A; secondly, novel N-benzylidene compounds of the formula

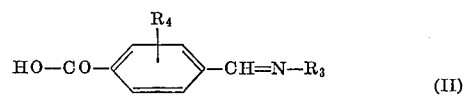

(II)

wherein $R_3$ has the same meaning as in Formula IA, but preferably represents alkyl of from 8 to 18 carbon atoms, and $R_4$ represents hydrogen or alkyl of from 1 to 4 carbon atoms;

and, thirdly, novel N-benzylidene compounds of the formula

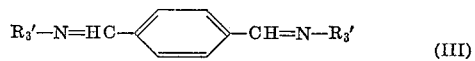

(III)

wherein $R_3'$ represents alkyl of from 8 to 18 carbon atoms.

The compounds of Formulae IA, II and III are distinguished from the other compounds of Formula I by especially strong fungicidal activity, and by particularly low phytotoxicity.

Where not expressly stated otherwise, wherever "alkyl" and "alkoxy" appear in the definitions of substituents lower alkyl and lower alkoxy, i.e. with from 1 to 4 carbon atoms, are preferred.

The above-mentioned compounds all of which fall under Formula I are obtained in a known manner by reacting a correspondingly substituted benzaldehyde of the formula

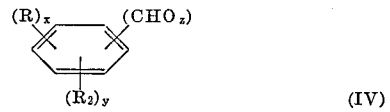

(IV)

with a corresponding amine of the formula

(V)

wherein $R_1$, $R_2$, $R_3$, $x$, $y$ and $z$ have the meanings given above.

The following non-limitative examples serve to illustrate the preparation of the new compounds of Formula II; parts and percentages are given therein by weight, unless expressly stated otherwise, and degrees are given in centigrades; 1 torr is practically equal to 1 mm. Hg.

EXAMPLE 1

14.0 grams (0.1 mol) of 4-chlorobenzaldehyde and 18.5 grams (0.1 mol) of n-dodecylamine are mixed together in 100 milliliters of benzene. The reaction mixture is heated to distill off the water of reaction as a benzene-water azeotrope. The heating is continued until no more water distilled. The remaining solvent and excess amine are then removed by distillation and an N-(4-chlorobenzylidene) - n - dodecylamine product recovered as residue. The crude residue is redistilled at 145° and 0.005 torr and the pure product recovered.

EXAMPLE 2

17.5 grams (0.1 mole) of 2,4-dichlorobenzaldehyde and 21.3 (0.1 mole) of tetradecylamine are mixed together in 100 milliliters of benzene. The reaction mixture is heated to distill off the water of reaction as a benzene-water azeotrope. The heating is continued until no more water distills. The remaining solvent and excess amine are then removed by distillation and an N-(2,4-dichlorobenzylidene)-tetradecylamine product recovered as residue. The product recrystallized from isopropyl alcohol has a melting point of 40° C.

As active compounds for fungicidal agents according to the invention, the following compounds of the general Formula I may be used; which are produced in an analogous manner by the procedure described in Examples 1 and 2.

| Compound | |
|---|---|
| N-benzylidene-octylamine | B.P. 95° C/0.01 torr. |
| N-benzylidene-decylamine | B.P. 115° C/0.01 torr. |
| N-benzylidene-dodecylamine | B.P. 136° C/0.01 torr. |
| N-(4-methylbenzylidene)-decylamine | B.P. 120° C/0.05 torr. |
| N-(4-methylbenzylidene)-dodecylamine | B.P. 145° C/0.05 torr. |
| N-(4-chlorobenzylidene)-octylamine | B.P. 125° C/0.01 torr. |
| N-(4-chlorobenzylidene)-decylamine | B.P. 114° C/0.01 torr. |
| N-(4-chlorobenzylidene)-dodecylamine | B.P. 145° C/0.005 torr. |
| N-(4-chlorobenzylidene)-tetradecylamine | M.P. 31° C. |
| N-(2,4-dichlorobenzylidene)-octylamine | M.P. 5° C. |
| N-(2,4-dichlorobenzylidene)-decylamine | M.P. 10° C. |
| N-(2,4-dichlorobenzylidene)-dodecylamine | M.P. 25° C. |
| N-(2,4-dichlorobenzylidene)-tetradecylamine | M.P. 40° C. |
| N-(2,4-dichlorobenzylidene)-octadecylamine | M.P. 62° C. |
| N-(3,4-dichlorobenzylidene)-octylamine | B.P. 118° C/0.01 torr. |
| N-(3,4-dichlorobenzylidene)-decylamine | B.P. 140° C/0.01 torr. |
| N-(3,4-dichlorobenzylidene)-dodecylamine | B.P. 155° C/0.01 torr. |
| N-(3,4-dichlorobenzylidene)-tetradecylamine | M.P. 25° C. |
| N-(2-hydroxybenzylidene)-octylamine | B.P. 177° C/0.01 torr. |
| N-(2-hydroxybenzylidene)-decylamine | B.P. 128° C/0.01 torr. |
| N-(2-hydroxybenzylidene)-dodecylamine | M.P. 10° C. |
| N-(2-hydroxybenzylidene)-tetradecylamine | B.P. 175° C/0.01 torr. |
| N-(2-hydroxy-3,5-dichlorobenzylidene)-octylamine | B.P. 172° C/0.01 torr. |
| N-(2-hydroxy-3,5-dichlorobenzylidene)-decylamine | M.P. 24° C. |
| N-(2-hydroxy-3,5-dichlorobenzylidene)-dodecylamine | M.P. 30° C. |
| N-(4-hydroxybenzylidene)-decylamine | M.P. 81° C. |
| N-(4-hydroxybenzylidene)-dodecylamine | M.P. 87° C. |
| N-(3,5-diisopropyl-4-hydroxybenzylidene)-octylamine | B.P. 164–166° C/0.04 torr. |
| N-(3,5-diisopropyl-4-hydroxybenzylidene)-decylamine | B.P. 175–180° C/0.01 torr. |
| N-(3,5-diisopropyl-4-hydroxybenzylidene)-dodecylamine | B.P. 192–195° C/0.01 torr. |
| N-(4-dimethylamino-benzylidene)-octylamine | B.P. 130° C/0.01 torr. |
| N-(4-dimethylamino-benzylidene)-decylamine | M.P. 27° C. |
| N-(4-dimethylamino-benzylidene)-dodecylamine | B.P. 181° C/0.005 torr. |
| N-(4-dimethylamino-benzylidene)-tetradecylamine | M.P. 51° C. |
| N-(4-dimethylamino-benzylidene)-octadecylamine | M.P. 58° C. |
| N-(2-chloro-4-dimethylamino-benzylidene)-octylamine | B.P. 154° C/0.01 torr. |
| N-(2-chloro-4-dimethylamino-benzylidene)-dodecylamine | M.P. 37° C. |
| N-(4-methoxybenzylidene)-octylamine | B.P. 105° C/0.05 torr. |
| N-(4-methoxybenzylidene)-decylamine | B.P. 130° C/0.01 torr |
| N-(4-methoxybenzylidene)-dodecylamine | B.P. 160° C/0.01 torr. |
| N-(4-hydroxybenzylidene)-octylamine | M.P. 72° C. |
| N-(4-methoxybenzylidene)-tetradecylamine | B.P. 170° C./0.01 torr. |
| N-[4-(β-dimethylamino-ethoxy)-benzylidene]-decylamine | B.P. 157° C./0.01 torr. |
| N-[4-(β-dimethylamino-ethoxy)-benzylidene]-dodecylamine | B.P. 176° C./0.01 torr. |
| N-[4-(β-diethylamino-ethoxy)-benzylidene]-decylamine | B.P. 163° C./0.01 torr. |
| N-[4-(β-diethylamino-ethoxy)-benzylidene]-dodecylamine | B.P. 195° C./0.01 torr. |
| N-(4-nitrobenzylidene)-octylamine | B.P. 140° C./0.001 torr. |
| N-(4-nitrobenzylidene)-decylamine | B.P. 160° C./0.01 torr. |
| N-(4-nitrobenzylidene)-dodecylamine | M.P. 36° C. |
| N-(4-nitrobenzylidene)-tetradecylamine | M.P. 44° C. |
| N-(2-chloro-5-nitrobenzylidene)-octylamine | M.P. 43° C. |
| N-(2-chloro-5-nitrobenzylidene)-decylamine | M.P. 55° C. |
| N-(2-chloro-5-nitrobenzylidene)-dodecylamine | M.P. 64° C. |
| N-(2-chloro-5-nitrobenzylidene)-tetradecylamine | M.P. 66° C. |
| N-(2-chloro-5-nitrobenzylidene)-octadecylamine | M.P. 80° C. |
| N-(4-cyanobenzylidene)-octylamine | |
| N-(4-cyanobenzylidene)-decylamine | |
| N-(4-cyanobenzylidene)-dodecylamine | |
| N-(4-methylthio-benzylidene)-octylamine | |
| N-(4-t-butylthio-benzylidene)-decylamine | |
| N-(4-n-propylthio-benzylidene)-dodecylamine | B.P. 138/0.02 torr. |
| p-Terephthalylidene-octylamine | B.P. 198° C./0.01 torr. |
| p-Terephthalylidene-decylamine | M.P. 37° C. |
| p-Terephthalylidene-dodecylamine | M.P. 49° C. |
| N-(3,5-di-tert.butyl-4-hydroxybenzylidene)-octylamine | M.P. 105–108° C. |
| N-(3,5-di-tert.butyl-4-hydroxybenzylidene)-decylamine | B.P. 165° C./0.05 torr. |
| N-(3,5-di-tert.butyl-4-hydroxybenzylidene)-dodecylamine | M.P. 81°. |
| N-(4-hydroxy-benzylidene)-oleylamine | M.P. 87–88°. |
| N-(4-carboxy-benzylidene)-dodecylamine | M.P. 104–106°. |
| N-(4-ethylamino-benzylidene)-myristylamine | |
| N-(4-isopropyl-benzylidene)-octylamine | B.P. 115°/0.04 torr. |
| N-(3-hydroxy-4-methyl-2-carboxy-benzylidene)-dodecylamine | M.P. 69°. |
| N-(2-carboxy-benzylidene)-dodecylamine | M.P. 104°. |
| N-(4-methoxycarbonyl-benzylidene)-dodecylamine | B.P. 168°/0.02 torr. |
| N-(pentachloro-benzylidene)-dodecylamine | M.P. 55°. |
| N-(4-bromo-benzylidene)-dodecylamine | |
| N-(fluoro-benzylidene)-octylamine | |
| N-(2,4,6-trihydroxy-benzylidene)-octylamine | |
| N-(2,4,6-trimethyl-benzylidene)-octylamine | B.P. 108°/0.02 torr. |
| N-(2,4-dimethoxy-benzylidene)-octylamine | |
| N-(2-chloro-4-dimethylamino-benzylidene)-decylamine | |
| N-(4-hydroxy-3-methoxycarbonyl-benzylidene)-dodecylamine [from 5-formyl-salicylic acid]. | |
| N-[3,5-bis(methoxycarbonyl)-benzylidene]-octylamine. | |
| N-[1,4-bis-(methoxycarbonyl)-benz-2-ylidene]-octylamine. | |
| N-[1,4-bis-(carboxy)-benz-2-ylidene]-octylamine. | |
| N-[3-carboxy-4-hydroxy-5-methyl-benzylidene]-dodecylamine. | |

EXAMPLE 3

To produce (a) a 10% and (b) a 2% dust, the following components are used:

(a)

| | Parts |
|---|---|
| N-benzylidene octylamine | 10 |
| Highly dispersed silicic acid | 5 |
| Stone powder | 85 |

(b)

| | |
|---|---|
| N-(4-dimethylaminobenzylidene)-octylamine | 2 |
| Highly dispersed slicic acid | 1 |
| Kaolin | 97 |

The active substances mentioned above are intimately mixed and milled with the carriers. The fungicidal dusts so obtained serve for the treatment of seed beds or for dusting plants.

EXAMPLE 4

The following components are used to produce (a) a 10% and (b) a 60% seed dressing:

(a)

| | Parts |
|---|---|
| N-(4-chlorobenzylidene)-dodecylamine | 10 |
| Kieselguhr | 5 |
| Liquid paraffin | 1 |
| Ground steatite | 84 |

(b)

| | |
|---|---|
| N-(4-methoxybenzylidene)-dodecylamine | 60 |
| Kieselguhr | 15 |
| Liquid paraffin | 1 |
| Ground steatite | 24 |

The active substances mentioned are intimately mixed in a mixer with the above listed carriers and the paraffin as dispersing agent and then the mixture is milled. The pulverulent seed dressings obtained serve for the treatment of all types of seeds.

EXAMPLE 5

To produce (a) a 2% and (b) a 5% granulate, the following components are used:

(a)

| | Parts |
|---|---|
| N-(4-methoxybenzylidene)-dodecylamine | 2 |
| Calcium silicate | 3 |
| Ground limestone (0.4–0.8 mm. diameter) | 92 |
| Spindle oil | 3 |

(b)

| | Parts |
|---|---|
| N-(4-dimethylaminobenzylidene)-dodecylamine | 5 |
| Calcium silicate | 6 |
| Ground limestone (0.4–0.8 mm. diameter) | 88 |
| Cetyl polyglycol ether | 1 |

The ground limestone is impregnated with either the spindle oil or the cetyl polyglycol ether and then mixed with a mixture of the active substance mentioned and the calcium silicate.

(c)

10% granulate:

| | Parts |
|---|---|
| N-[4-(β-diethylamino-ethoxy)-benzylidene]-dodecylamine | 10 |
| Calcium silicate | 8 |
| Ground limestone | 82 |

The above active substance is milled several times and mixed with the carriers.

This granulate is particularly suitable for the disinfection of seed beds.

EXAMPLE 6

To produce (a) and (b) 25%, and (c) 40%, wettable powders, the following components are used:

(a)

| | Parts |
|---|---|
| N-benzylidene dodecylamine | 25 |
| Kaolin | 10 |
| Silicic acid | 54 |
| Calcium-lignin sulphonate | 5 |
| Polyvinyl alcohol (50%) | 1 |
| Dibutyl naphthalene sulphonic acid (Na salt) | 5 |

(b)

| | Parts |
|---|---|
| N-(3,4-dichlorobenzylidene)-tetradecylamine | 25 |
| Kaolin | 55 |
| Highly dispersed silicic acid | 10 |
| Dibutyl naphthalene sulphonic acid (Na salt) | 5 |
| Calcium-lignin sulphonate | 5 |

(c)

| | Parts |
|---|---|
| N-(2,4-dichlorobenzylidene)-tetradecylamine | 40 |
| Calcium silicate | 40 |
| Kaolin | 8 |
| Dibutyl naphthalene sulphonic acid (Na salt) | 3 |
| Cetyl polyglycol ether | 4 |
| Calcium-lignin sulphonate | 5 |

The above active substances are mixed and finely milled with the carriers and dispersing agents given. Wettable powders of excellent wettability and suspendability are obtained which, with water, while forming suspensions, can be diluted to any concentration desired. Such suspensions are suitable for the treatment of cultivated plants.

EXAMPLE 7

To produce (a) a 25% and (b) a 50% emulsion concentrate, the following components are used:

(a)

| | Parts |
|---|---|
| N-(4-methoxybenzylidene)-tetradecylamine | 25 |
| Xylene | 45 |
| Diacetonyl alcohol | 20 |
| A combination emulsifying agent consisting of alkylaryl polyethylene glycol and the Ca salt of an alkylaryl sulphonate (e.g. Emullat P 140 HFP; Union Chimique Belge S.A. Brussels) | 10 |

(b)

| | Parts |
|---|---|
| N-(2,5-diisopropyl-4-hydroxybenzylidene)-decylamine | 50 |
| Xylene | 30 |
| Diacetonyl alcohol | 10 |
| A combination emulsifying agent consisting of alkylaryl polyethylene glycol and the Ca salt of an alkylaryl sulphonate (Emullat P 140 HFP; Union Chimique Belge S.A. Brussels) | 10 |

Each active substance is dissolved in the mixture of the above indicated parts of xylene and diacetonyl alcohol. The combination emulsifying agent is then added to this solution. A 25% or 50% emulsion concentrate is obtained which can be diluted with water to any concentration desired. Such emulsions are suitable for the treatment of cultivated plants.

The fungicidal activity of the active substances of the general Formula I was determined by a spore germination test with spores of the following types of fungi:

Alternaria tenuis  Fusarium culmorum
Botrytis cinerea  Mucor spec.
Clasterosporium c.  Penicillium spec.
Coniothyrium dipl.  Stemphylium cons.

1 ml. of a 1%, 0.1% and 0.01% acetone solution of the active substance is placed on 2 glass slides (26 x 76 mm.) under identical conditions. The solvent is evaporated and a uniform coating of active substance is obtained on the glass slides. The slides are inoculated with fungi spores and then kept in dishes at room temperature in an atmosphere which is almost saturated with steam. After 2–3 and 4–6 days, the germinated spores are counted.

The results are summarised in the following table:

| Active Substance | Alt. ten | Botr. cin | Clast. c. | Coni dipl. | Fus. culm | Muc. spec. | Penic spec. | Stemph. cons. |
|---|---|---|---|---|---|---|---|---|
| N-benzylidene-octylamine | + | + | + | + | + | + | + | + |
| N-benzylidene-dodecylamine | ++ | ++ | ++ | ++ | ++ | ++ | ++ | ++ |
| N-(4-chlorobenzylidene)-dodecylamine | ++ | ++ | ++ | ++ | + | ++ | ++ | ++ |
| N-(3,4-dichlorobenzylidene)-tetradecylamine | ++ | ++ | ++ | ++ | + | ++ | ++ | ++ |
| N-(2,4-dichlorobenzylidene)-tetradecylamine | ++ | ++ | ++ | ++ | + | ++ | ++ | ++ |
| N-(4-methoxybenzylidene)-dodecylamine | +++ | +++ | +++ | +++ | +++ | +++ | +++ | +++ |
| N-(4-methoxybenzylidene)-tetradecylamine | ++ | ++ | ++ | ++ | ++ | ++ | ++ | ++ |
| N-(4-dimethylaminobenzylidene)-dodecylamine | ++ | ++ | ++ | ++ | ++ | ++ | ++ | ++ |
| N-(4-dimethylaminobenzylidene)-tetradecylamine | ++ | ++ | ++ | ++ | ++ | ++ | ++ | ++ |
| N-[4-(β-diethylaminoethoxy)-benzylidene]-dodecylamine | + | + | + | + | ++ | ++ | + | + |
| N-(4-dimethylaminobenzylidene)-octylamine | + | + | + | + | + | + | + | + |
| N-(4-isopropylbenzylidene)-octylamine | + | + | ++ | ++ | + | + | + | + |
| N-(4-isopropylbenzylidene)-n-propylamine (known from U.S. Patent 2,914,560) | – | – | – | – | – | – | – | – |
| N-(4-isopropylbenzylidene)-n-butylamine (known from U.S. Patent 2,914,560) | – | – | + | + | – | + | – | – |
| N-(2,4-dichlorobenzylidene)-butylamine (known from U.S. Patent 2,920,101) | – | – | – | + | – | – | – | – |
| N-(3,4-dichlorobenzylidene)-butylamine (known from U.S. Patent 2,920,101) | – | – | – | + | – | – | – | – |

+ means an at least 90% inhibition of germination effected by the residue of 1 ml. of a 1% acetone solution of active substance
++ means the same effect attained by the residue of 1 ml. of a 0.1% acetone solution of active substance.
+++ means the same effect attained by the residue of 1 ml. of a 0.01% acetone solution of active substance
– means no inhibition of germination with the concentrattions of active substance given above.

N-(4-chloro-benzylidene)-ω-carboxydecylamine is particularly active against fungi of the soil, especially *Sclerotinia sclerotiorum*.

The fungicidal action of active substance, falling under Formula I has further been tested on:

(1) *Botrytis cinerea* on beans (*Vicia Faba*).
(2) *Erysiphe cichoracearum* on potted cucumber plants (*Cucumis sativus*).
(3) *Uromyces appendiculatus* on beans (*Phaseolus Vulgaris*).

These tests are carried out as follows:

(1) *Botrytis cinerea* on beans (*Vicia Faba*).—Petri dishes are lined with moist filter paper and in each dish three freshly cut bean leaves (*Vicia Faba*) are placed upper side downwards. The leaves are then sprayed with a 0.1% aqueous suspension of active substance. A Petri dish with control plants is left unsprayed. After the spray coating has dried, the leaves are infested with a fresh suspension of spores of *Botrytis cinerea*. The dishes are covered and left to stand for 1–2 days at room temperature. The test is then evaluated as follows:

0=no growth of fungi
1–9=graduated strength of attack, culminating in
10=total infestation (corresponding to that of the control plants).

The following results were obtained:

| Compound: | Strength of attack |
|---|---|
| N-(4-carboxy-benzylidene)-dodecylamine | 3 |
| N-(2-carboxy-3-hydroxy-4-methyl-benzylidene)-dodecyl-amine | 2 |
| N-(2-carboxy-benzylidene)-dodecylamine | 1 |

(2) *Erysiphe cichoracearum* on potted cucumber plants (*Cucumis sativus*).—Leaves of potted cucumber plants are sprayed with a 0.1% aqueous suspension of active substance. After the spray coating has dried, the leaves are sprayed with a fresh suspension of spores of *Erysiphe cichoracearum* after which they are put in a moist chamber for 1 days and then placed in a green-house. Pots with control plants are left unsprayed. After about 7 days, the test was evaluated as follows:

0=no attack by fungi
1–9=graduated strength of attack, culminating in
10=total infestation (corresponding to that of the control plants).

The following results were obtained:

| Compound: | Strength of attack |
|---|---|
| N-(4-carboxy-benzylidene)-dodecylamine | 1 |
| N-(2-carboxy-3-hydroxy-4-methyl-benzylidene)-dodecylamine | 5 |
| N-(2-carboxy-benzylidene)dodecylamine [1] | 1 |

[1] Plants show very slight leaf burns.

(3) *Uromyces appendiculatus* on beans (*Phaseolus vulgaris*).—Leaves of bean plants (*Phaseolus vulgaris*) in the two-leaf stage were sprayed with an aqueous suspension containing 0.1% of active substance, which is obtained from the 10% wettable powder described as form for application above, by dilution with water. A plot of control plants is left unsprayed.

After drying, the leaves are infested with a fresh suspension of spores of *Uromyces appendiculatus*. The plants are then left for one day in a moist room and then kept in a green-house. After about 7 to 10 days, the test is evaluated as follows:

0=no attack by fungi
1–9=graduated strength of attack, culminating in
10=total infestation (corresponding to the control plants).

The following results were obtained:

| Compound: | Strength of attack |
|---|---|
| N-(4-carboxy-benzylidene)-dodecylamine | 1 |
| N-(2-carboxy-3-hydroxy-4-methyl-benzylidene)-dodecylamine [1] | 1 |
| N-(2-carboxy-benzylidene)-dodecylamine [1] | 0 |
| N-(4-methoxycarbonyl-benzylidene)-dodecylamine [1] | 1 |
| N-(4-n-propylthio-benzylidene)-dodecylamine | 2 |

[1] Plants show very slight leaf burns.

We claim:

1. A method for combatting phytopathogenic fungi and for protecting living plants and parts thereof from attack by said fungi, comprising applying to said plant or plant parts to be protected against such attack, or to a planted area in which such fungi are to be combatted, a fungicidally effective amount of a compound of the formula

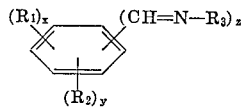

wherein
$R_1$ represents hydrogen, halogen, hydroxy or alkyl of from 1 to 4 carbon atoms,
$R_2$ represents hydrogen, halogen, nitro, cyano, carboxy, alkoxycarbonyl, alkyl, alkylamino, dialkylamino, alkoxy, dialkylamino-alkoxy or alkylthio, each of the seven preceding members having from 1 to 4 carbon atoms in each alkyl moiety,
$R_3$ represents alkyl or alkenyl, each having from 8 to 18 carbon atoms,
$x$ represents a whole number of from 1 to 3,
$y$ represents a whole number of from 1 to 2,
$z$ represents the number 1 or 2, and the sum of $x$, $y$ and $z$ is not greater than 6.

2. A method as described in claim 1, wherein said compound is of the formula

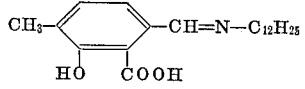

3. A method as described in claim 1, wherein said compound is of the formula

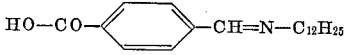

4. A fungicidal composition comprising
(a) as active ingredient, in an amount of from about 0.5 to 80%, a compound of the formula

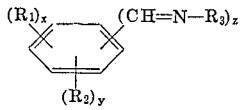

wherein
$R_1$ represents hydrogen, halogen, hydroxy or alkyl of from 1 to 4 carbon atoms,
$R_2$ represents hydrogen, halogen, nitro, cyano, carboxy, alkoxycarbonyl, alkyl, alkylamino, dialkylamino, alkoxy, dialkylamino-alkoxy or alkylthio, each of the seven preceding members having from 1 to 4 carbon atoms in each alkyl moiety,
$R_3$ represents alkyl or alkenyl, each having from 8 to 18 carbon atoms,
$x$ represents a whole number of from 1 to 3,
$y$ represents a whole number of from 1 to 2,
$z$ represents the number 1 or 2, and the sum of $x$, $y$ and $z$ is not greater than 6, and (b) an agriculturally acceptable carrier selected from the group consisting of kaolin, steatite, bole, loess, chalk, limestone, dolomite, feldspar, mica, calcium sulfate magnesium sulfate, stone powder, ground silica waste, milled synthetic plastics, fertilizer, ground vegetable products and lignin, said amount of active ingredient being calculated on the total weight of the composition.

5. A fungicidal composition as defined in claim 4, further comprising a non-phytotoxic surfactant capable of improving the adhesion of said active ingredient to plants and parts thereof.

6. A composition as described in claim 4, wherein said active ingredient is the compound of the formula

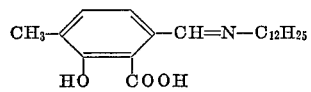

7. A composition as described in claim 4, wherein said active ingredient is the compound of the formula

References Cited

UNITED STATES PATENTS

| | | | |
|---|---|---|---|
| 2,765,340 | 10/1956 | Haury | 260—566 |
| 2,847,473 | 8/1958 | Robertson. | |
| 2,914,560 | 11/1959 | Robertson | 260—566 |
| 3,253,022 | 5/1966 | Lindner | 260—566 |

OTHER REFERENCES

Chem. Abstract, 42, p. 334/d (1948).

ALBERT T. MEYERS, Primary Examiner

S. J. FRIEDMAN, Assistant Examiner

U.S. Cl. X.R.

260—566